(12) United States Patent
Wang et al.

(10) Patent No.: US 12,547,577 B1
(45) Date of Patent: Feb. 10, 2026

(54) SHARED RESOURCE MANAGEMENT IN PARTITIONED SYSTEMS

(71) Applicant: Amazon Technologies, Inc., Seattle, WA (US)

(72) Inventors: Tinghui Wang, Snoqualmie, WA (US); Jue Wang, Seattle, WA (US); Tahsin Erdogan, Kirkland, WA (US); Said Bshara, Tira (IL); Guy Nakibly, Kedumim (IL); Omri Itach, Haifa (IL); Idan Homri, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 18/758,923

(22) Filed: Jun. 28, 2024

(51) Int. Cl.
*G06F 13/42* (2006.01)
*G06F 11/22* (2006.01)
*G06F 13/16* (2006.01)
*G06F 13/28* (2006.01)

(52) U.S. Cl.
CPC ........ *G06F 13/4282* (2013.01); *G06F 11/221* (2013.01); *G06F 13/1668* (2013.01); *G06F 13/28* (2013.01); *G06F 2213/0026* (2013.01); *G06F 2213/16* (2013.01)

(58) Field of Classification Search
None
See application file for complete search history.

(56) References Cited

U.S. PATENT DOCUMENTS

| | | | | |
|---|---|---|---|---|
| 11,782,497 | B2 * | 10/2023 | Yang | G06F 1/3253 |
| | | | | 713/323 |
| 2008/0147887 | A1 * | 6/2008 | Freimuth | G06F 13/4022 |
| | | | | 710/1 |
| 2014/0181454 | A1 * | 6/2014 | Manula | G06F 12/1027 |
| | | | | 711/170 |
| 2017/0262179 | A1 * | 9/2017 | Suizu | G06F 3/0659 |
| 2022/0083338 | A1 * | 3/2022 | Gonion | G06F 9/30047 |
| 2024/0329137 | A1 * | 10/2024 | Yardley | G01R 31/31907 |

* cited by examiner

*Primary Examiner* — Michael Sun
(74) *Attorney, Agent, or Firm* — Klarquist Sparkman, LLP

(57) ABSTRACT

Computing systems and associated methods are described for managing error conditions associated with shared resources in a partitioned computing system. In some examples, a flush signal is generated by a controller of an expansion card or other component of the partitioned computing system responsive to detecting a communication issue between the component and a first host partition. Responsive to the flush signal, an Input/Output (I/O) fabric of the component terminates active memory transactions for the first host partition and transmits a success status signal associated with the active memory transactions to an initiator of the active memory transactions. The controller may then reset a port coupled to the first host partition to prepare the component for re-establishing a link with the first host partition.

20 Claims, 7 Drawing Sheets

SHARED RESOURCE MANAGEMENT IN PARTITIONED SYSTEMS

BACKGROUND

Server computers, including those operating in a datacenter environment for providing computing resources for cloud computing, can include multiple processors. Configuration of the processors is typically limited to the design provided by the processor's manufacturer. In order to increase flexibility of the server computers, there is a need to partition components of the server for independent control and management. However, management of error handling for resources that are shared between host partitions is needed to provide effective stability of the system as a whole and to ensure isolation of partitioned components.

DETAILED DESCRIPTION

As described above, computing systems, such as server computers, may be partitioned to provide independent control of processors in a multi-processor architecture. For example, interconnect buses between processors in a server computer can be reconfigured on startup or dynamically ("hot add/drop") by one or more multiplexers or by otherwise enabling or disabling the interconnect buses, thereby allowing the server computer to be flexibly organized into desired numbers of partitions (each with a given number of processors), to maximize or change interconnect bandwidth between connected processors in a partition, or to minimize or reduce impact ("blast radius") of failed processors or interconnect buses. Each processor can have its own configuration logic to allow partitioning of the server computer as small as a single socket. In an alternative configuration, a common configuration logic can be partitioned and act as separate configuration logics for each partition. For example, a 4-socket processor server can be reconfigured into four single-processor systems, two two-processor systems with three interconnect buses, or a single four-processor fully-connected system. In another example, an 8-socket processor server can be reconfigured into two four-processor fully-connected systems or a single eight-processor system. Other arbitrary interconnect topology and/or partitioning are also possible.

The disclosed technologies provide new approaches to managing error handling in partitioned computing systems with shared resources. Disclosed examples include workflows to respond to link down events or other issues affecting memory transactions associated with a host partition and a shared resource of the partitioned computing system. As used herein, memory transactions may refer to an exchange of data to perform a read and/or write operation to retrieve data from one location and store data in another location. Additional details relating to managing error handling in a partitioned computing environment are provided below.

Figure 1:
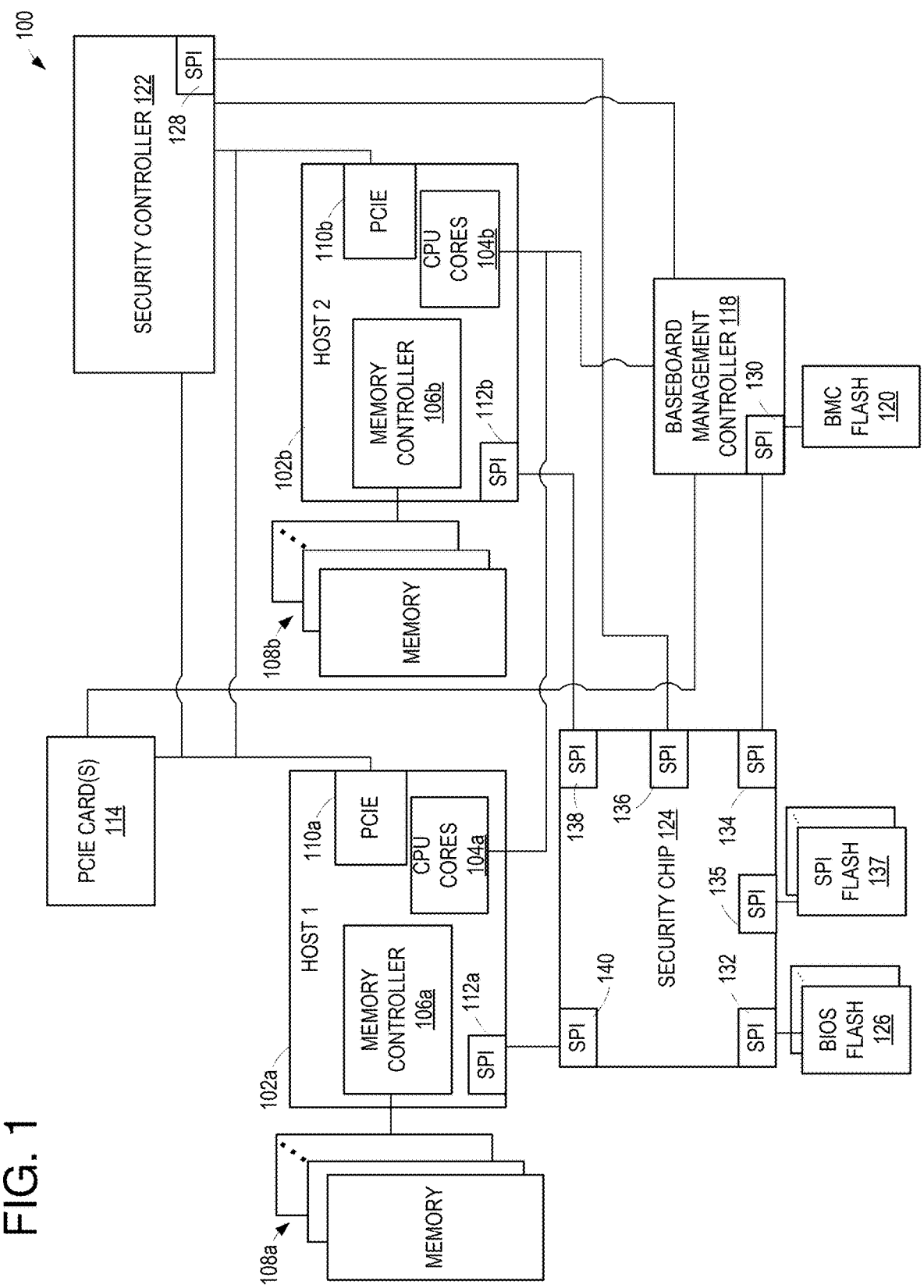
FIG. 1 is a diagram of an example server computing system including partitioned processing resources.

FIG. 1 shows an example computing system 100 that includes partitioned computing resources (e.g., processing cores) configured to communicate with components of the system. In some examples, one or more of the components of system 100 are disposed (e.g., integrated and/or mounted) on a single motherboard or other printed circuit board (PCB). For example, system 100 includes two partitions comprising host package 102a and host package 2 102b (also referred to herein as hosts, or host 1 and host 2, respectively). Each host package 102a and 102b includes respective central processing unit (CPU) cores 104a/104b, a respective memory controller 106a/106b for communicating with memory devices 108a and/or 108b, a respective peripheral component interconnect express (PCIe) interface 110a and 110b, and a respective serial peripheral interface (SPI) 112a and 112b. Although only two partitions are shown in the illustrated example, it is to be understood that the disclosed configuration may be applied in systems that utilize additional or different partition configurations without departing from the scope of the disclosure. Additionally, it is to be understood that examples of the disclosure may be used to perform configuration changes when switching between operating the components of FIG. 1 as a partitioned system (e.g., a partitioned mode, where hosts 1 and 2 are isolated from one another to operate independently and/or reduce/eliminate inter-CPU communications between CPU cores 104a and 104b) and operating the components of FIG. 1 as a non-partitioned system (e.g., a non-partitioned mode, where CPU cores 104a and 104b operate as two cores of a single host and are enabled for inter-CPU communications with one another).

The memory controller 106a/106b may include a digital circuit comprising logic configured to control access to and/or manage flow of data to/from associated memory hardware, such as memory devices 108a and 108b. Memory devices 108a/108b may include any suitable storage devices including random-access memory such as dynamic random-access memory integrated circuits including dual in-line memory modules (DIMMs), single in-line memory modules (SIMMs), small outline DIMMs, and/or other memory devices. The memory controller 106a/106b may be integrated into a same chip as a microprocessor comprising the CPU cores 104a/104b in some examples. In other examples, the memory controller 106a/106b may be integrated on a separate chip from one or more of the CPU cores 104a/104b.

The CPU cores 104a/104b may be configured to execute instructions in the memory 108a/108b and/or execute instructions received over one or more communication channels, such as the communication channels described below and illustrated by connecting lines in FIG. 1. One or more of the CPU cores 104a/104b may be integrated on a single microprocessor chip, and may be configured to process data independently from one another (e.g., able to work on different tasks simultaneously) and/or may operate in coordination with one another in a serial or parallel manner to perform operations in the computing system. The operations may include any computing operation, which may involve reading, writing, modifying, erasing, and/or otherwise manipulating data in the memory devices 108a/108b. In additional or alternative examples, the operations may include performing calculations or other computing services, for example using data in the memory devices 108a/108b.

The PCIe interfaces 110a/110b may include hardware interfaces and associated drivers that connect the host packages 102a/102b to respective devices configured to communicate according to PCIe standards. For example, PCIe cards 114 may include any suitable devices configured to communicate according to PCIe standards, such as graphics processing units, networking interface cards, storage devices, etc. In other examples, PCIe cards 114 may include other types of expansion cards, such as cards configured to communicate according to other standards (e.g., Peripheral Component Interconnect (PCI) standards). The PCIe cards 114 may be connected to PCIe interfaces 110a and/or 110b to allow the host 1 102a and/or host 2 102b to communicate with and/or control the PCIe cards. One or more of the PCIe cards 114 may serve as a shared resource that is usable by both hosts 1 and 2 in some examples. Additional example details relating to the components and operations of the PCIe cards 114 are described below with respect to FIG. 2.

A baseboard management controller (BMC) 118 may be used for monitoring and managing the system 100. For example, the baseboard management controller 118 may include one or more processors configured to execute instructions for performing its operations, and may be configured as a System-on-Chip (SoC) or other circuitry, which may be connected on the same motherboard or printed circuit board as other components of system 100, such as the host packages 102a/102b. The baseboard management controller 118 may include onboard memory (e.g., flash memory) and/or may access connected memory such as BMC flash 120 for retrieving instructions (e.g., boot-code, settings, embedded operating systems, etc.) and/or storing data resulting from monitoring/management operations (e.g., buffering and/or logging data). Example operations performed by the baseboard management controller 118 include, but are not limited to power cycling the system, monitoring hardware component operations/conditions (e.g., temperature, fan speed, etc.), monitoring for failures, etc. Additional operations that may be performed by the BMC 118 are described in more detail below with regard to workflow and/or signaling performed during system configuration changes as well as runtime system monitoring.

The computing system 100 further includes one or more security cards, such as security controller 122. The security cards may include dedicated hardware components with processing capabilities (e.g., 64-bit processing capabilities) and specialized Application Specific Integrated Circuits (ASICs) that operate independently from the system main board that runs all user compute environments, including code and data processing operations. The security cards implement the outward-facing control interfaces used by the compute service provided by the computing system to provision and manage compute, memory, and storage. They also provide all I/O interfaces, such as those usable to provide software-defined networking, elastic block storage, and instance storage. This means that all the components that interact with the outside world of the compute service beyond the main system board—whether logically inbound or outbound—run on self-contained computing devices which are physically separate from the system main board on which user workloads run.

The configuration shown in FIG. 1 enables strong logical isolation between the host components and the security cards, and further physical isolation between the two provides a firm and reliable boundary which contributes to that configuration. While logically isolated and physically separate, security cards may be included within the same physical server enclosure as a host's system main board and share its power supply, along with its PCIe interface.

Components of the security cards include a System on a Chip (SoC) package that runs purpose-built firmware. Control firmware on the security cards may be live-updated, using cryptographically signed software packages. Security cards can be updated independently of other components of the computing system, including of one another and of any updateable components on the system main board in order to deploy new features and security updates.

The security cards may be physically connected to the system main board and its processors via PCIe, but are otherwise logically isolated from the system main board that runs user workloads. In examples where there is more than one security card, they may be connected through an internal network within a server enclosure. This network provides a private communication channel between security cards that is independent of the system mainboard, as well as a private connection to the baseboard management controller 118.

The security controller 122 provides the hardware root of trust for the overall computing system 100. It may be responsible for managing all other components of an associated server system, including the firmware loaded onto the other components of the system. Firmware for the system as a whole is stored on an encrypted solid state drive (SSD) that is attached directly to the security controller 122, in some examples. The encryption key for the SSD may be designed to be protected by the combination of a Trusted Platform Module (TPM) and the secure boot features of the System-on-Chip (SoC).

In some examples, the secure boot process of the SoC in the security controller 122 starts with its boot ROM and then extends a chain of trust by measuring and verifying early stages firmware stored in flash attached to the security controller. As the system initialization progresses, a trusted platform module (TPM) is used to record the initial boot code measurements, and then to extend measurements to additional system firmware. The cryptographic keys embedded in the tamper-resistant TPM are used to digitally sign the complete set of known good system measurements. This digitally signed file is then compared to all subsequent system measurements at each reboot to detect any unexpected changes.

If no changes are detected, additional decryption keys encrypted by keys locked in the TPM are used to decrypt additional data in the system to allow the boot process to continue. If changes are detected, the additional data is not decrypted and the system is immediately removed from service and will therefore not host user workloads.

The preceding steps detail the process by which the security controller 122 may establish the integrity and validity of system software on boot. For secure boot design to be truly secure, each stage of SoC boot code may be evaluated as being valid and unmodified, and also functionally correct as implemented. This is also true of the static ROM code that is a part of the physical manufacturing of the device. To that end, the memory safety properties of early-stage boot code may be verified.

The security controller 122 may be implemented as an exclusive gateway between the physical server and the control planes for connected services. The security controller 122 presents to the dedicated control plane network a set of strongly authenticated and encrypted networked APIs for system management. Every API action is logged and all attempts to call an API are cryptographically authenticated and authorized using a fine-grained access control model. Each control plane component is authorized only for the set of operations needed for it to complete its business purpose.

The security cards may provide hardware programming interfaces over the PCIe connection to the main server processor—NVMe for block storage, Elastic Network Adapter (ENA) for networking, a serial port for out-of-band OS console logging and debugging, and so on. In some examples, a system is configured to use a hypervisor, in which each PCIe function provided by the security controller 122 is sub-divided into virtual functions using single-root input/output virtualization (SR-IOV) technology. This facilitates assignment of hardware interfaces directly to virtual machines. Customer data (content that customers transfer for processing, storage, or hosting) moves directly between instances and these virtualized I/O devices provided by the security controller 122. This minimizes the set of software and hardware components involved in the I/O, resulting in lower costs, higher performance, and greater security.

The security controller 122 and other security cards together operate as one domain in a security system and the system main board with its processors (e.g., CPU cores 104a/104b), on which customer workloads run, makes up the second. While the security controller 122 and its secure boot process provide the hardware root of trust in a security system, an additional component is used to extend that trust and control over the system main board. A security chip 124 may be used as a link between those two domains that extends the control of the security controller 122 to the system main board, making it a subordinate component of the system, thus extending the security controller 122 chain of trust to cover it.

The security chip 124 may include a device integrated into the server's system main board. At runtime, it intercepts and moderates all operations to local non-volatile storage devices and low speed system management bus interfaces (such as Serial Peripheral Interface (SPI) and I2C)—in other words, to all firmware. Example operations that may be moderated include read, write, and/or other access to memory devices or other components of the computing system 100. In other examples, moderated operations may include operations (e.g., data read, write, modification, and/or processing) performed by other components of the computing system 100. The security chip 124 may execute instructions read and/or loaded from a BIOS flash 126 (e.g., a BIOS flash device) in some examples. In additional or alternative examples, the host 102a and/or 102b may access BIOS flash 126 (or a respective BIOS flash device, where BIOS flash 126 may represent multiple flash memory storage devices storing respective firmware for hosts 102a and 102b) directly (e.g., BIOS flash 126 may connect to SPI 112a and/or SPI 112b).

The security chip 124 is also situated between the BMC 118 and the main system CPU (e.g., CPU cores 104a/104b) on a high-speed connection, which enables this interface to be logically firewalled on production systems. The security chip 124 is controlled by the security controller 122. The security controller 122, through its control of the security chip 124, is therefore able to mediate and validate updates to the firmware, or programing of other non-volatile devices, on the system mainboard or security cards of a system.

A common industry practice is to rely on a hypervisor to protect these system hardware assets, but when no hypervisor is present—such as when a compute service is used in bare metal mode—an alternative mechanism may be used to ensure that users cannot manipulate system firmware. The security chip 124 provides the security function of ensuring that the main system CPUs cannot update firmware in bare metal mode. Moreover, when a hypervisor is used, the security chip 124 also provides defense in depth in addition to the protections for system hardware assets provided by the hypervisor.

The security chip 124 also provides a second security function during system boot or reset. It controls the physical reset pins of the server system main board, including its CPUs 104a/104b and the BMC 118. This enables the security controller 122 to complete its own secure boot process, then verify the integrity of the basic input/output system (BIOS), BMC, and all other system firmware before instructing the security chip 124 to release the main CPUs and BMC from being held in reset. Only then can the CPUs and BMC begin their boot process using the BIOS and firmware that have just been validated by the security controller 122.

In the above examples, data may be communicated between the security chip 124 and other components of the system 100, including the host package 102a/102b, the security controller 122, and the BMC 118. In each instance, the security chip 124 may be used to communicate data for performing read, write, or other operations at the targeted component. The communicated data may be transmitted via an emulated SPI associated with the targeted component using an associated emulated SPI (e.g., an SPI emulator, where the security chip 124 includes one or more SPI emulators). For example, emulated SPI 132 may be used to communicate with the BIOS flash 126, emulated SPI 134 may be used to communicate with the BMC 118 via SPI 130, emulated SPI 135 may be used to communicate with one or more SPI flash memory devices 137 (e.g., configured to store configuration information and/or other data used by the security chip 124), emulated SPI 136 may be used to communicate with the security controller 122 via SPI 128, emulated SPI 138 may be used to communicate with the host package 102b via SPI 112b, and emulated SPI 140 may be used to communicate with the host package 102a via SPI 112a. It is to be understood that one or more of the emulated SPIs described above may additionally or alternatively include SPI interfaces in some examples. In each of the above examples, the interfaces that communicate with one another may be understood to be coupled to one another. Although shown as separate interfaces, it is to be understood that in some examples, the same interface may be used for communicating with multiple targeted components.

In order to operate with existing SPI hardware and drivers in the host packages (and other components, such as the BMC 118), the emulated SPI 132-140 of the security chip 124 may be configured to send/receive data using SPI signals and opcodes that are able to be interpreted by SPI drivers (e.g., native SPI drivers in SPI interfaces 112a, 112b, 128, and/or 130), while using some SPI fields to target particular applications for using data sent via the SPI communication channels.

Figure 2:
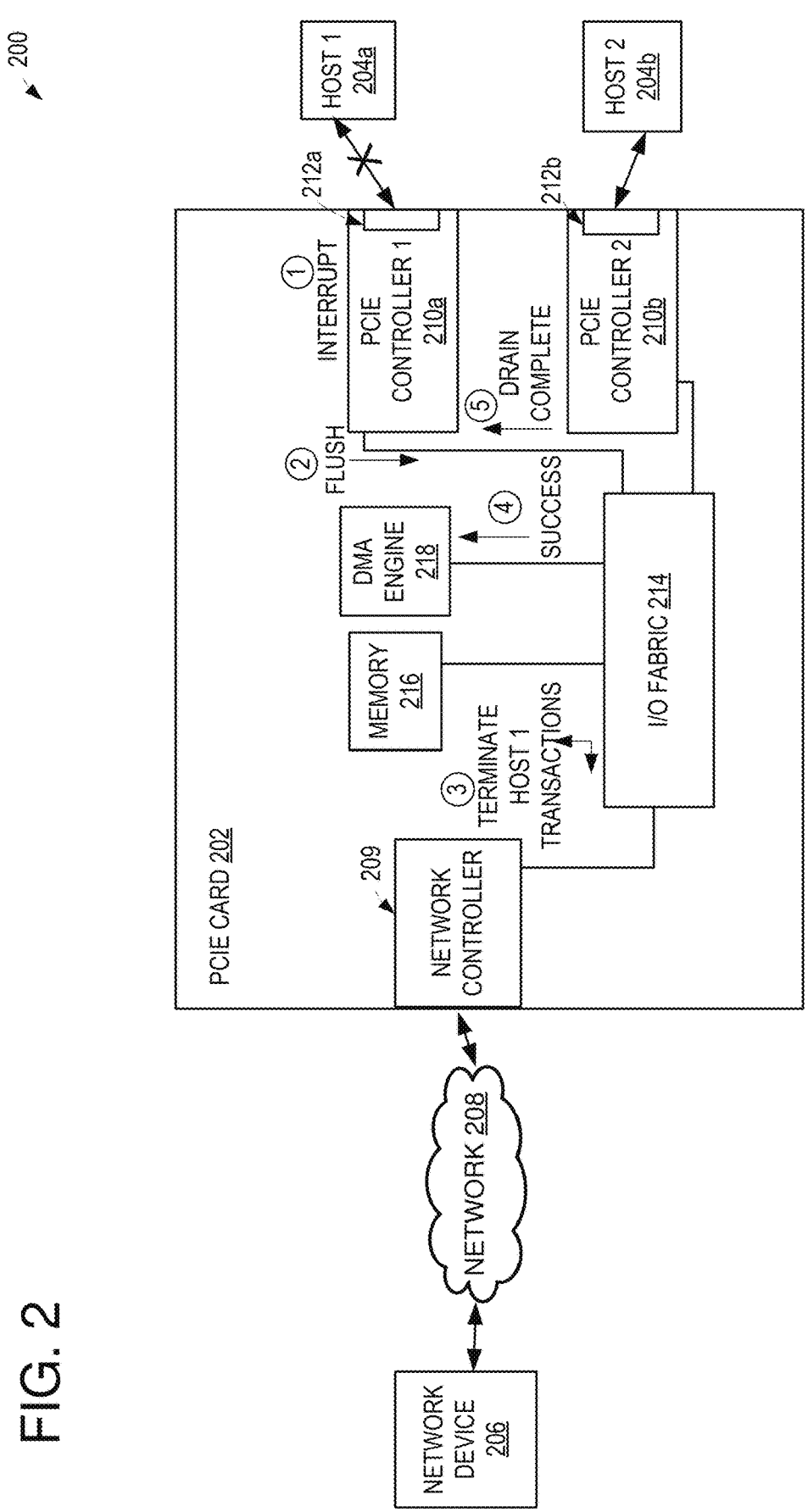
FIG. 2 is a diagram of an example Peripheral Component Interconnect Express (PCIe) card and associated connected components in a partitioned computing system.

FIG. 2 is a block diagram showing components of resources shared between host partitions in a computing environment 200 and example operations performed by the shared resources in response to error conditions experienced by one or more of the host partitions. For example, the computing environment 200 includes a PCIe card 202, which is a computing resource shared by multiple host partitions of a computing system (e.g., host 1 204a and host 2 204b as shown in the illustrated example, although it is to be understood that the PCIe card 202 may be expanded to be shared by additional hosts in other examples). PCIe card 202 may be an example of PCIe cards 114 of FIG. 1 and hosts 1 204a and 2 204b may be examples of host partition 1 102a and host partition 2 102b, respectively, of FIG. 1. As described above with respect to FIG. 1, PCIe cards, such as PCIe card 202, may include any suitable device configured to communicate according to PCIe standards. In other examples, it is to be understood that other expansion cards or other computing components, which may have similar or different components to PCIe card 202 (including expansion cards operating in accordance with other standards, such as Peripheral Component Interconnect (PCI) cards) may be operated as described herein with respect to PCIe cards. As an illustrative example, in FIG. 2, PCIe card 202 is shown as including network interfacing capabilities, where the PCIe card 202 is configured to communicate with a network device 206 via a network 208 (e.g., via a network controller 209). The network device 206 may be any suitable computing device or system in communication with the PCIe card 202 over the network 208, and may include a network data storage device from which data may be read to perform a write transaction (e.g., to write data from the network device to a targeted host memory) and/or to which data may be written (e.g., data that is read from a targeted host memory may be written to memory of the network device) in some examples. The network controller 209 may include and/or be in communication with a communication interface for connecting the PCIe card 202 to the network 208, one or more memory devices, one or more controllers/engines (e.g., a direct memory access engine) to control memory transactions for data transmitted to/from the network 208, and/or one or more other components. It is to be understood that in other examples, PCIe card 202 may be configured to provide additional or alternative functionality and/or connect to additional or alternative devices. For example, the PCIe card 202 may additionally or alternatively include other capabilities such as data storage interface(s) or other PCIe engine interfaces.

The PCIe card 202 includes a first PCIe controller 210a connected to and/or including port 212a and a second PCIe controller 210b connected to and/or including port 212b, where ports 212a and 212b connect the PCIe card 202 to host 1 204a and host 2 204b, respectively. For example, host 1 204a may establish a communication link to PCIe card 202 via a connection through port 212a, and host 2 204b may establish a communication link to PCIe card 202 via a connection through port 212b. The communication link for a given host may provide a point-to-point communication channel between the host and the PCIe card 202 to allow the host and the PCIe card to send and receive data for various communications, including memory read/write transactions (e.g., reading data from the host to the PCIe card for propagation to the network device or writing data from the PCIe card, such as data read from the network device, to the host), memory-mapped input/output transactions originating from a CPU of a selected host 204a and/or 204b and directed to the PCIe card 202, and/or configuration space transactions originating from the CPU of the selected host and directed to the PCIe card 202. The PCIe controller 210 may include an integrated circuit, processor, and/or other processing component that is configured to execute instructions (e.g., firmware and/or software stored in a memory device included in and/or accessible to the PCIe controller) to operate the PCIe card 202 in accordance with PCIe standards and/or to otherwise control and/or coordinate operations of other components of the PCIe card 202. For example, the PCIe controller 210 may be configured to monitor a link status of communication links associated with ports 212a and 212b (and any other ports in examples where additional hosts are connected to the PCIe card 202).

The PCIe controllers 210a/210b may also be configured to control an I/O fabric 214 to coordinate the flow of data within the PCIe card 202 (e.g., data transmitted between components of the PCIe card 202 for communication between the hosts 204a/204b, the PCIe card 202, and/or the network device 206). The I/O fabric 214 may include data pathways within a system-on-chip (SoC) of the PCIe card 202 connecting components of the PCIe card to one another, to facilitate the transmission of data between ports for external communication (e.g., to the hosts and to the network 208, respectively). For example, the I/O fabric may deliver data for memory transactions (e.g., direct memory access (DMA) and memory-mapped I/O transactions) in multiple directions (e.g., between components of the PCIe card 202, such as toward/from PCIe controllers 1 and 2 210a/210b for data targeted toward/from hosts 204a and 204b, and/or toward/from a network controller 209 for data targeted toward/from network 208), including connecting a DMA engine 218 and memory 216 to the PCIe controllers 210a/210b.

The DMA engine 218 may be configured to control access to a memory 216 of the PCIe card 202. For example, the memory 216 may include one or more random-access memory devices and/or other data storage devices configured to store instructions for execution by processors of the PCIe card 202 and/or to buffer or store data communicated via the I/O fabric 214. The DMA engine 218 may include one or more processing chips, integrated circuits, microprocessors, and/or other processing components configured to control the access and/or flow of data between the memory 216 and one or more other components (e.g., the I/O fabric 214).

In one example of normal operation of the PCIe card 202, during a DMA write transaction, data may be retrieved from the network device 206 and read into the memory 216 using the I/O fabric 214 in coordination with the network controller 209 and the DMA engine 218, where the I/O fabric 214 initiates and manages the flow of data from the network controller (e.g., a DMA engine of the network controller) to the memory 216 and the DMA engine 218 coordinates access of the I/O fabric 214 to the memory 216. The data is then read from the memory 216 and written to a targeted host (e.g., host 2 204b) via the communication link between the host and the associated port (e.g., port 212b), where the I/O fabric 214 again manages the flow of data from the memory 216 to the PCIe controller 2 210b (and included port 212b) and the DMA engine 218 again coordinates access of the I/O fabric 214 to the memory. Once the write transaction is complete, the I/O fabric 214 sends a success status message from the PCIe controller 210b to the DMA engine 218. For example, the success status message may include an "OK" designation (e.g., a single bit value, such as a "1," indicating a successful transaction), as opposed to an error message that would normally be associated with terminations.

As represented by the "X" on the communication link between host 1 204a and port 212a, that communication link may be down in the illustrated example (e.g., the host 1 204a may be unable to communicate with the PCIe card over the communication link). In some examples, a cause of the link being down may include a reset of the host (e.g., a warm reset, cold reset, etc.) or other condition (e.g., power cycle, unexpected shut down/power down, operating system crash, instance reboot/termination, and/or other bug or error condition) that causes the host to lose connection with the PCIe card 202. As shown at operation "1," in response to a detection of the link to host 1 204*a* being down, an interrupt may be generated at the PCIe controller 210*a* to indicate the link status. In other systems, this interrupt may cause a PCIe controller to reset the PCIe card and/or to initiate operations that result in one or more of the PCIe card components entering a failure or abort state. For example, in other systems, if transactions are terminated prior to completion, a failure status signal may be sent to an originator/initiator of the transaction (e.g., a DMA engine 218) or a success status signal to the originator/initiator of the transaction may be withheld. In either case, the resulting failure or lack of success may be reported to a direct memory access (DMA) engine (described in more detail below) of the PCIe card, causing the DMA engine to enter a failure mode. As the PCIe card 202 is shared between the host 1 204*a* and the host 2 204*b*, resetting the PCIe card 202 or having components of the PCIe card 202 enter a failure state in response to a lost link with host 1 204*a* may cause a disruption to traffic being communicated between PCIe card 202 and host 2 204*b*, despite the communication link between PCIe card 202 and host 2 204*b* remaining healthy.

Accordingly, in response to the interrupt signal at "1," the PCIe controller 210*a* generates and sends a flush signal, as indicated at "2," configured to cause input/output (I/O) fabric 214 to terminate outstanding memory transactions from all directions and to drain in-flight transactions by terminating the in-flight transactions (as shown at "3") with a success response status returned to the initiator (e.g., the DMA engine 218, as shown at "4"). For example, in-flight transactions may include transactions with at least some data (e.g., in-flight data) that has not yet reached the targeted host/component. Terminating in-flight transactions may thus include terminating the transactions prior to at least some of the data (e.g., the in-flight data) reaching the targeted host/component. In this way, the DMA engine 218 maintains operation throughout the link down event for host 1 204*a*, allowing memory transactions for host 2 204*b* to continue being serviced while host 1 204*a* is being reset or otherwise is not able to communicate with PCIe card 202. The flush signal may be sent via a wire connection between the PCIe controller 210*a* and the I/O fabric 214 (e.g., where the I/O fabric 214 includes logic that connects main components such as direct memory access controllers to secondary components such as PCIe Out bound directions). In response to the flush signal, the I/O fabric terminates any new transaction to the PCIe controller that gets a link down event, and the new transaction that is terminated by the I/O fabric is terminated with an error indication to the DMA transaction's respond.

Once the memory transactions are drained, the I/O fabric 214 is configured to send a signal to PCIe controller 210*a*, as shown at "5," to alert the PCIe controller 210*a* of the completion of this task, which triggers the PCIe controller 210*a* to perform a link down handling operation to address the error condition associated with host 1 204*a*. For example, the link down handling operation may include resetting PCIe controller configuration space for host 1 204*a* (e.g., memory accessible by the PCIe controller 210*a* that is designated as storing configuration information for host 1 204*a*, where resetting the configuration space may include clearing data from the configuration space to allow configuration data from a flash memory for the host 1 204*a*, such as a BIOS flash 126 of FIG. 1, to be loaded into the configuration space upon reset of the PCIe controller), resetting and/or re-initializing the PCIe controller 210*a*, and re-establishing a link with the host 1 204*a* (e.g., by resetting a port status for port 212*a*).

Figure 3:
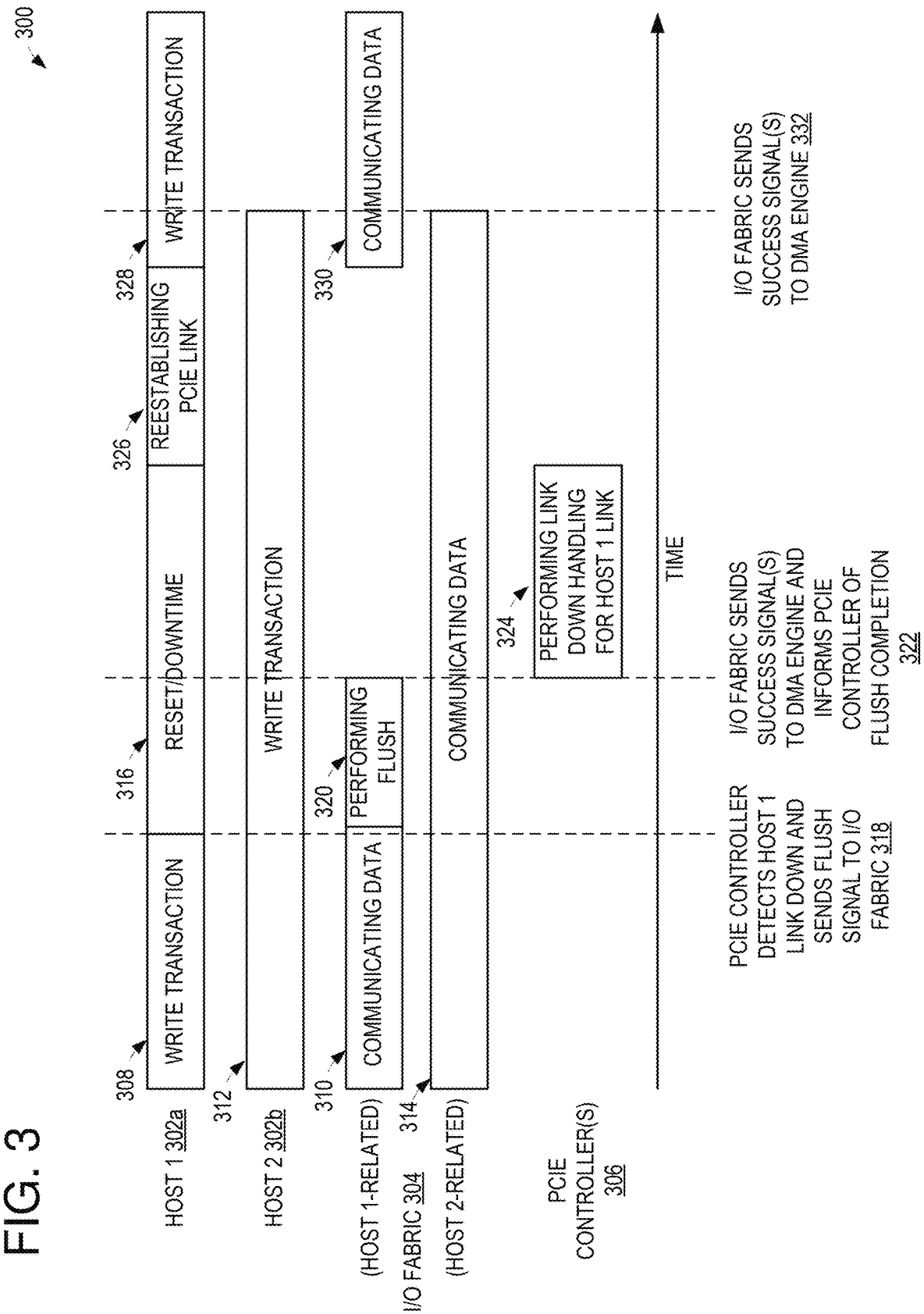
FIG. 3 is a timing diagram showing an example of a sequence of operations and statuses of components in a partitioned computing system with shared resources.

FIG. 3 shows a timing diagram 300 of an example sequence of operations and/or statuses of components in a partitioned computing system, including a host 1 302*a*, host 2 302*b*, I/O fabric 304 and one or more PCIe controllers 306. For example, these components may be examples of the similarly-named components in system 100 of FIG. 1 and/or computing environment 200 of FIG. 2. It is to be understood that the operations and components shown in timing diagram 300 may not be exhaustive, and additional or alternative operations may be performed during the times represented in the timing diagram 300 to perform the transaction handling and associated controls/signaling described with respect to FIG. 3.

At an initial time of the diagram, host 1 302*a* and host 2 302*b* are both participating in active write transactions, as shown at 308 and 312, respectively, where data for the write transactions is being communicated by the I/O fabric 304 at 310 and 314, respectively. At 316, the host 1 302*a* enters a reset/downtime state (e.g., the host 1 experiences a reset and/or otherwise loses connection with the PCIe card). As a result, at 318, an associated PCIe controller 306 detects that the communication link for host 1 302*a* is down, and in response sends a flush signal to the I/O fabric including instructions to control the I/O fabric to terminate and drain active memory transactions for the host 1 302*a*. In response, as shown at 320, the I/O fabric performs the flush (e.g., terminates and drains memory transactions for host 1 302*a*, as described in more detail above with respect to FIG. 3). Notably, the I/O fabric continues servicing the write transaction for host 2 302*b* by communicating data at 314, even while and after performing the flush at 320 for the transactions for host 1.

After the flush is performed, the I/O fabric sends one or more success signals to a DMA engine (or other initiator of the memory transactions that were flushed) and informs the PCIe controller of the flush completion, as indicated at 322, which triggers the PCIe controller to perform a link down handling for the host 1 link, as shown at 324 and described in more detail above with respect to FIG. 2 and below with respect to FIG. 4. Again, notably, the I/O fabric 304 continues communicating data to service the write transaction for host 2 302*b* even while the PCIe controller performs the link down handling for the host 1.

At 326, the host 1 302*a* re-establishes a communication link with the PCIe card and then begins a write transaction at 328, for which data is communicated at 330. As shown at 332, the write transaction for host 2 302*b* concludes and, in response, the I/O fabric sends one or more success signals to the initiator(s) of the memory transactions for host 2 302*b* (e.g., a DMA engine). It is to be understood that success signals are transmitted to the initiator of a given memory transaction upon completion or flushing of the memory transaction, so at 332, success signals are also transmitted for any memory transaction of the write transaction 328 of host 1 302*a* that have completed.

Figure 4:
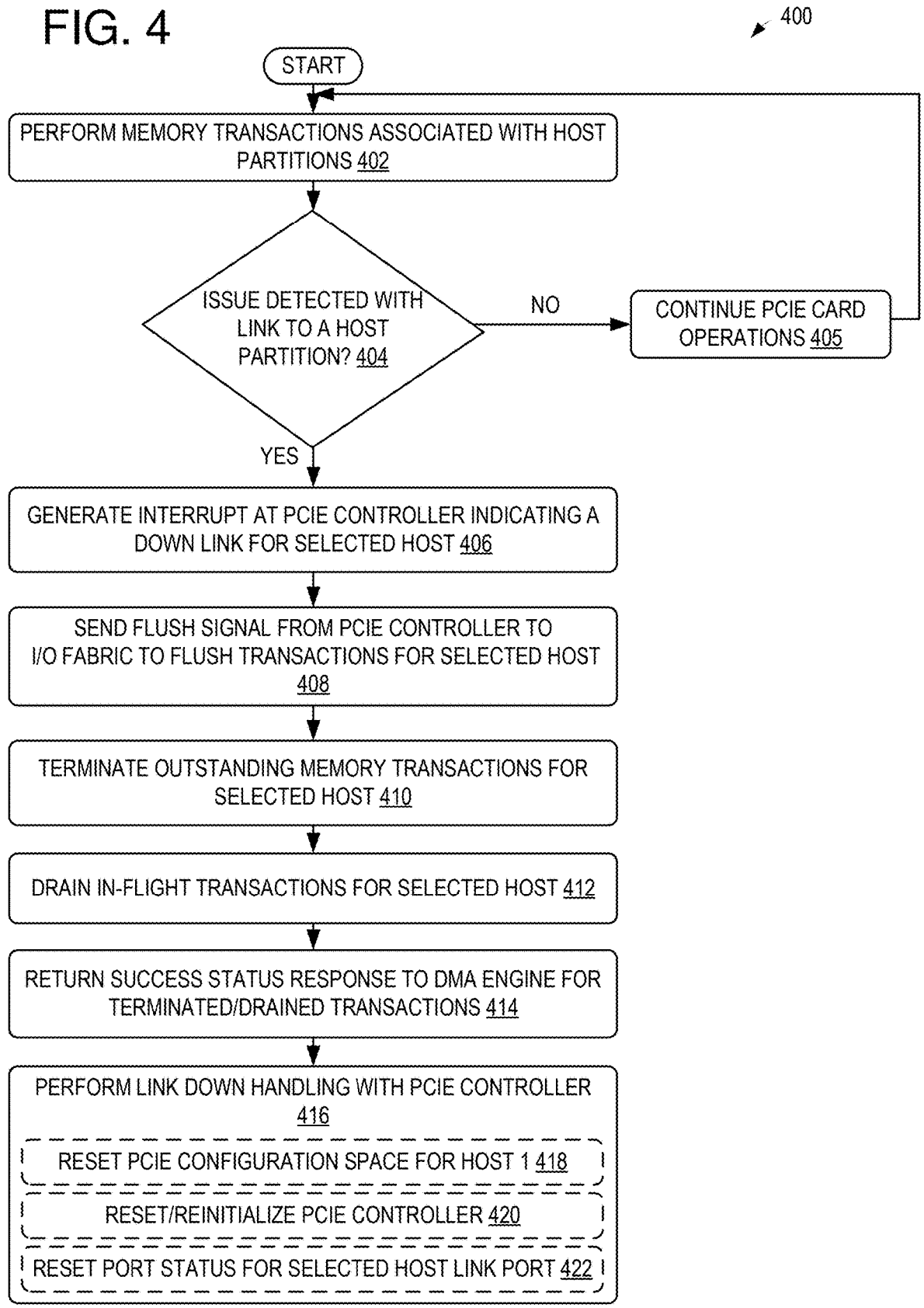
FIG. 4 is a flow chart of an example method for managing error handling in a partitioned system with shared resources.

FIG. 4 shows a flow chart of an example method 400 for managing error conditions in a partitionable computing system. For example, method 400 may be performed by an expansion card for a partitioned computing system, such as PCIe cards 114 of FIG. 1 and/or PCIe card 202 of FIG. 2, and/or may otherwise be operated in a server computer system, such as system 100 of FIG. 1 and/or a computing environment such as computing environment 200 of FIG. 2. At 402, the method includes performing memory transactions associated with one or more host partitions of a partitioned computing system.

At 404, the method includes determining if an issue is detected with a link to a host partition of the partitioned computing system. For example, a detected issue may include a link down condition, which may represent a condition in which the PCIe card is unable to communicate with the selected host partition (e.g., as used in the description of this example method, the selected host partition may be the host partition that is experiencing an issue with a link to the PCIe card that is detected at 404). In some examples, the issue may be detected responsive to a reset of the host partition. If an issue is not detected (e.g., "NO" at 404), the method includes continuing the PCIe card operations, as indicated at 405, and the method returns to 402 to perform the memory transactions.

If an issue is detected (e.g., "YES" at 404, the method includes generating an interrupt or other notification at a PCIe controller indicating a down link for the selected host (e.g., the selected host including the host(s) having the issue detected at 404), as indicated at 406. In response to the interrupt at 406, the method includes sending a flush signal from the PCIe controller to an I/O fabric of the PCIe card to flush transactions for the selected host, as indicated at 408. For example, the flush signal may include a control signal(s) configured to cause the I/O fabric to terminate outstanding memory transactions for the selected host, as indicated at 410, and to drain in-flight transactions for the selected host, as indicated at 412. The flush signal sent at 408 may also be configured to cause the I/O fabric to return a success status response to the DMA engine (or other initiator of the memory transactions) corresponding to the transactions that are terminated at 410 and/or drained at 412, as indicated at 414. For example, as described above, in other systems, terminating or draining transactions such that the data does not reach the intended host may result in sending a failure status signal (or otherwise may result in not sending a success status signal), which is propagated to a DMA engine, causing the DMA engine to reset and/or enter a failure state. However, by sending the success signal at 414 even if all of the data for the drained/terminated transactions do not reach the selected host (e.g., of the transactions are terminated prior to at least some of the data, such as the in-flight data, reaching the selected host), the DMA engine is maintained in an active, non-failure state that enables it to continue operating for transactions for other hosts.

At 416, the method includes performing a link down handling with the PCIe controller. For example, after draining the in-flight transactions at 412, the I/O fabric may send a signal to the PCIe controller indicating that the transaction draining is completed, which may trigger the PCIe controller to perform the link down handling at 416. As described in more detail above with respect to FIG. 2, the link down handling may include resetting a PCIe configuration space for the selected host, as indicated at 418, resetting and/or re-initializing the PCIe controller 420, and/or resetting a port status for the port corresponding to the selected host (e.g., the port used for establishing a communication link with the selected host).

Figure 5:
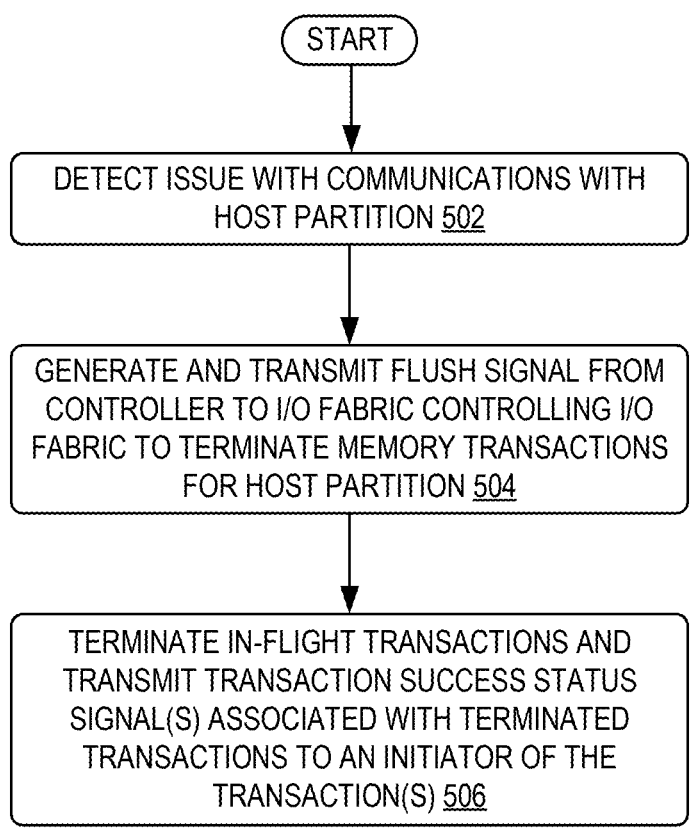
FIG. 5 is a flow chart of another example method for managing error handling in a partitioned system with shared resources.

FIG. 5 shows a flow chart of another example method 500 for managing error conditions in a partitionable computing system. For example, method 500 may be performed by an expansion card or other component for a partitioned computing system, such as PCIe cards 114 of FIG. 1 and/or PCIe card 202 of FIG. 2, and/or may otherwise be operated in a server computer system, such as system 100 of FIG. 1 and/or a computing environment such as computing environment 200 of FIG. 2. At 502, the method includes detecting an issue with communications with a host partition. For example, as described above, the issue may include a reset of the host or another event that causes the communication link between the host and the expansion card or other component to be disrupted or disconnected.

At 504, the method includes generating and transmitting a flush signal from a controller to an I/O fabric, the flush signal controlling the I/O fabric to terminate memory transactions for the host partition. At 506, the method includes terminating in-flight transactions for the host partition and transmitting one or more transaction success status signals associated with the terminated transactions to an initiator of the transaction(s) (e.g., an initiator of the terminated transactions, such as a DMA engine, central processing unit, etc.). For example, as described above with respect to FIGS. 2-4, active and/or in-flight memory transactions may be terminated and data for the in-flight memory transactions may be drained without being sent to the affected host partition (e.g., the host partition experiencing a communication issue with the expansion card or other component). Although this data is not sent to the host partition, the success status signal is generated and transmitted in order to prevent other components of the system (e.g., a DMA engine of the expansion card, as described above with respect to FIG. 2) from entering a failure mode and/or state/condition in which the component(s) shut down, reset, and/or are otherwise unavailable to service memory transactions or other operations for unaffected host partitions coupled to the expansion card.

Figure 6:
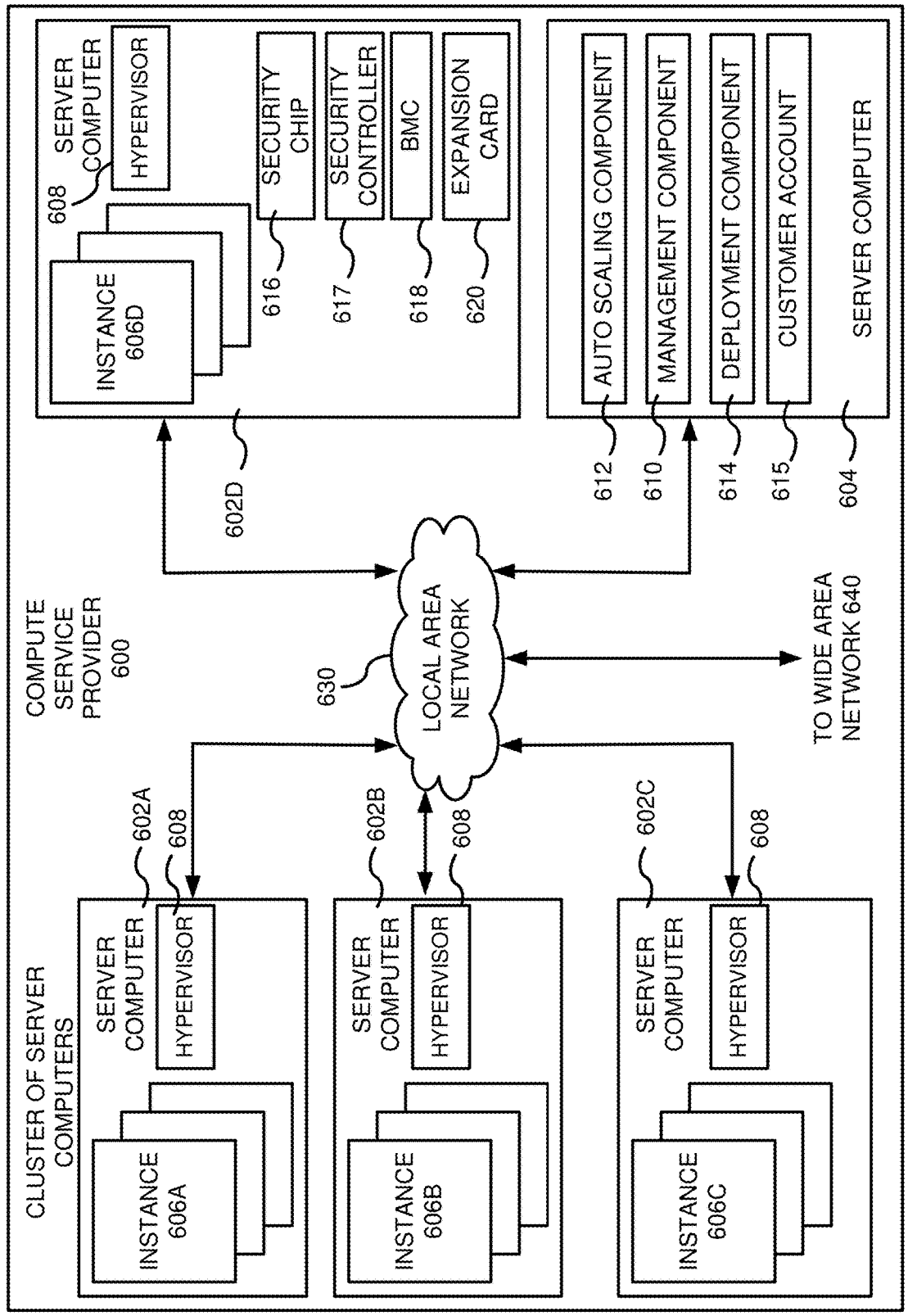
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the compute service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. The server computers 602A-602D may include a system comprising one or more of the components of system 100 of FIG. 1 and/or the computing environment 200 of FIG. 2. As shown in the example of server computer 602D, a security chip 616, a security controller 617, a baseboard management controller (BMC) 618, and an expansion card (e.g., a PCIe card or other component) 620 may be included, which may be an example of security chip 124 of FIG. 1, security controller 122 of FIG. 1, BMC 118 of FIG. 1, and PCIe cards 114 of FIG. 1 and/or PCIe card 202 of FIG. 2, respectively. The security chip 616 may be used in coordination with the security controller 617 and BMC 618 (and other components of the server computer 602D) to control operations in the server computer as described above with respect to FIG. 1, and the expansion card 620 may be used as a shared resource between host partitions of the server computer 602D that manages link down events to protect multiple partitions from transaction failures, as described above with respect to FIGS. 2-5.

In one embodiment, the instances 606A-606D are virtual machines. As known in the art, a virtual machine is an instance of a software implementation of a machine (i.e., a computer) that executes applications like a physical machine. In the example of virtual machine, each of the servers 602A-602D can be configured to execute a hypervisor 608 or another type of program configured to enable the execution of multiple instances 606 on a single server.

Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end customers can access the compute service provider 600. It should be appreciated that the network topology illustrated in FIG. 6 has been simplified and that many more networks and networking devices can be utilized to interconnect the various computing systems disclosed herein.

Figure 7:
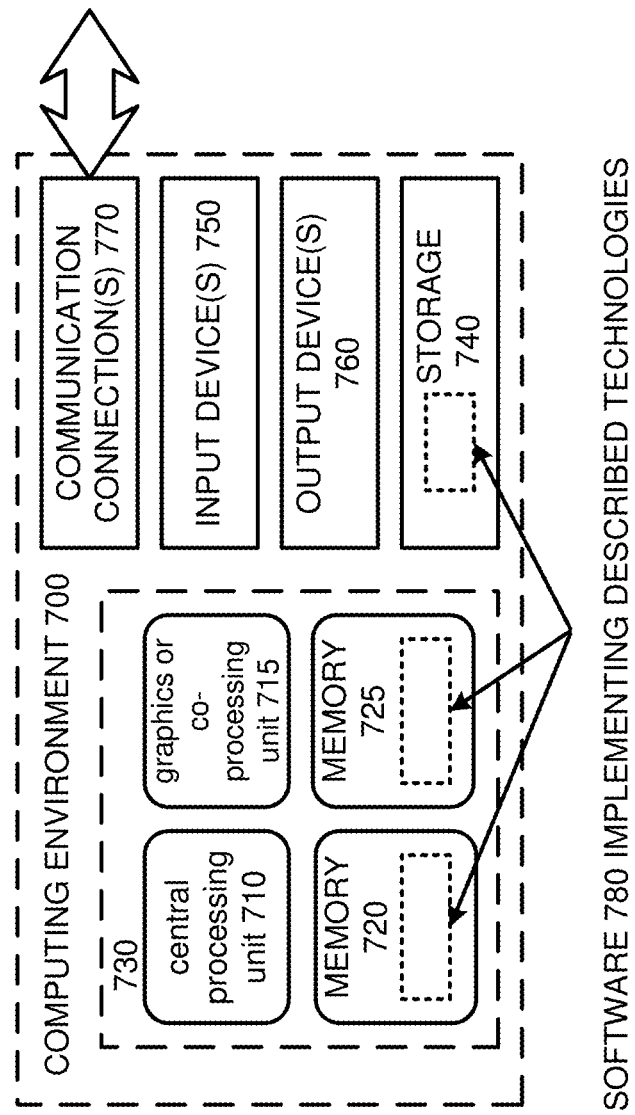
FIG. 7 depicts a generalized example of a suitable computing environment in which the described innovations may be implemented.

FIG. 7 depicts a generalized example of a suitable computing environment 700 in which the described innovations may be implemented. For example, the computing environment 700 may include and/or may be included in the computing system 100 of FIG. 1 and/or the computing environment 200 of FIG. 2 (or components thereof) and/or one or more components of computing environment 700 may be used in performance of the operations of timing diagram 300 of FIG. 3 and/or methods 400 and/or 500 of FIGS. 4 and 5, respectively. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The processing units 710, 715 may be examples of and/or may include CPU cores such as CPU cores 104a and 104b of FIG. 1. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, the memory 720, 725 may include memory 108a/108b, BIOS flash 126, and/or SPI flash 137 of FIG. 1 and/or memory 216 of FIG. 2 and/or may include instructions executable by other components of system 100 of FIG. 1 and/or computing environment 200 of FIG. 2 to perform the operations described herein, including the operations shown in timeline diagram 300 of FIG. 3 and/or methods 400 and/or 500 of FIGS. 4 and 5.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A server computing system comprising:
    a first host comprising a first processor core;
    a second host comprising a second processor core; and
    a Peripheral Component Interconnect Express (PCIe) card coupled to the first host and the second host via a first port and a second port, respectively, wherein the PCIe card comprises a PCIe controller, an Input/Output (I/O) fabric, and a Direct Memory Access (DMA) engine controlling access to memory of the PCIe card, and wherein the PCIe card is configured to:
        detect, with the PCIe controller, an issue with a communication link to the first host;
        send, with the PCIe controller, a flush signal to the I/O fabric responsive to detecting the issue;
        responsive to receiving the flush signal, terminate and drain, with the I/O fabric, outstanding memory transactions for the first host and send a success status response to the DMA engine for the outstanding memory transactions; and
        perform a link down handling operation with the PCIe controller to prepare the PCIe card for reconnection with the first host, the link down handling operation including resetting a port status for the first port.

2. The server computing system of claim 1, wherein the link down handling operation further includes resetting a configuration space for the first host in the PCIe card and reinitializing the PCIe controller.

3. The server computing system of claim 1, wherein the outstanding memory transactions for the first host include in-flight transactions of data that has not yet reached the first host and wherein terminating and draining the outstanding memory transactions includes terminating the in-flight transactions prior to at least some of data of the memory transactions reaching the first host.

4. The server computing system of claim 3, wherein detecting the issue with the communication link comprises generating, at the PCIe controller, an interrupt indicating the issue with the communication link.

5. The server computing system of claim 1, wherein the issue comprises a loss of the communication link with the first host caused by a reset of the first host.

6. The server computing system of claim 1, wherein the I/O fabric is configured to continue servicing active memory transactions for the second host while and after terminating and draining the outstanding memory transactions for the first host.

7. A computer-implemented method comprising:
  detecting an issue with communications between a host partition and a component of a partitioned computing system;
  generating and transmitting a flush signal from a controller of the component to Input/Output (I/O) fabric of the component, wherein the flush signal controls the I/O fabric to terminate memory transactions for the host partition; and
  terminating in-flight memory transactions for the host partition and transmitting, to an initiator of the terminated in-flight memory transactions, a success status signal associated with the terminated in-flight memory transactions.

8. The computer-implemented method of claim 7, wherein the component comprises a Peripheral Component Interconnect Express (PCIe) card.

9. The computer-implemented method of claim 7, further comprising receiving, at the controller, an indication that the in-flight memory transactions are terminated, and, in response to the indication, performing a link down handling operation with the controller to prepare the component for reconnection with the host partition.

10. The computer-implemented method of claim 9, wherein the link down handling operation comprises one or more of: resetting a configuration space for the host partition in memory of the component, resetting or re-initializing the controller, or resetting a port status for a port that is coupled to the host partition.

11. The computer-implemented method of claim 7, wherein the host partition is a first host partition, and wherein the component is further coupled to a second host partition to perform additional memory transactions for the second host partition.

12. The computer-implemented method of claim 11, wherein the success status signal is configured to prevent the initiator of the terminated in-flight memory transactions from entering a failure state, and wherein the I/O fabric is configured to continue servicing the additional memory transactions for the second host partition while and after terminating the in-flight memory transactions for the first host partition.

13. The computer-implemented method of claim 7, wherein the in-flight memory transactions comprise Direct Memory Access (DMA) write transactions for writing data to memory of the host partition.

14. The computer-implemented method of claim 13, wherein terminating the in-flight memory transactions comprises terminating the in-flight memory transactions prior to at least some of the data of the DMA write transactions reaching the host partition.

15. A computing system comprising:
  a printed circuit board having a plurality of computing components integrated or mounted thereon, the plurality of computing components comprising:
    a first host comprising a first processor core;
    a second host comprising a second processor core; and
    a first component coupled to the first host and the second host and comprising a controller and an Input/Output (I/O) fabric, wherein the first component is configured to:
      perform first memory transactions associated with the first host and second memory transactions associated with the second host, the first memory transactions including communicating first data between the first component and the first host and the second memory transactions including communicating second data between the first component and the second host;
      send, with the controller, a flush signal to the I/O fabric responsive to detecting an issue in communications with the first host; and
      responsive to receiving the flush signal, terminating and draining, with the I/O fabric, the first memory transactions including in-flight data of the first data that has not yet reached the first host, and sending a success status response to an initiator of the first memory transactions.

16. The computing system of claim 15, wherein the first component comprises a Peripheral Component Interconnect (PCI) card or a Peripheral Component Interconnect Express (PCIe) card.

17. The computing system of claim 15, wherein the first component is further configured to send a notification from the I/O fabric to the controller indicating that the first memory transactions are terminated and drained.

18. The computing system of claim 17, wherein, responsive to receiving the notification, the controller is further configured to reset a configuration space for the first host in memory of the first component and re-initialize or reset the controller.

19. The computing system of claim 18, wherein, responsive to receiving the notification, the controller is further configured to reset a port status for a port coupled to the first host.

20. The computing system of claim 15, wherein the I/O fabric is configured to continue servicing the second memory transactions for the second host while and after terminating the first memory transactions for the first host.

* * * * *